United States Patent
Buer

(10) Patent No.: US 7,999,556 B2
(45) Date of Patent: Aug. 16, 2011

(54) METHOD AND APPARATUS FOR IDENTIFYING AND SELECTING PROPER CABLE CONNECTIONS

(75) Inventor: Kenneth V Buer, Gilbert, AZ (US)

(73) Assignee: ViaSat, Inc., Carlsbad, CA (US)

( * ) Notice: Subject to any disclaimer, the term of this patent is extended or adjusted under 35 U.S.C. 154(b) by 222 days.

(21) Appl. No.: 12/494,731

(22) Filed: Jun. 30, 2009

(65) Prior Publication Data

US 2009/0323786 A1    Dec. 31, 2009

Related U.S. Application Data

(60) Provisional application No. 61/077,010, filed on Jun. 30, 2008.

(51) Int. Cl.
*G01R 31/08* (2006.01)
*G01R 31/11* (2006.01)

(52) U.S. Cl. ......... 324/512; 324/533; 324/539; 375/220

(58) Field of Classification Search .................. None
See application file for complete search history.

(56) References Cited

U.S. PATENT DOCUMENTS

| | | | | |
|---|---|---|---|---|
| 5,027,074 A | * | 6/1991 | Haferstat | 324/539 |
| 5,627,474 A | * | 5/1997 | Baudisch | 324/539 |
| 6,825,672 B1 | * | 11/2004 | Lo et al. | 324/533 |
| 7,884,615 B1 | * | 2/2011 | Lo et al. | 324/533 |
| 2006/0148438 A1 | | 7/2006 | Manku | |

FOREIGN PATENT DOCUMENTS

| | | |
|---|---|---|
| JP | 2004-266356 | 9/2004 |
| JP | 2006-527536 | 11/2006 |

OTHER PUBLICATIONS

International Preliminary Report on Patentability dated Jan. 5, 2011, PCT/US2009/049173, 4 pages.
ISR and Written Opinion from corresponding Int'l Application No. PCT/US09/049173 dated Feb. 12, 2010.

\* cited by examiner

*Primary Examiner* — Vinh P Nguyen
(74) *Attorney, Agent, or Firm* — Snell & Wilmer LLP

(57) ABSTRACT

A system includes a first electrical component, a second electrical component, and at least two cables connecting the first and second electrical components. Time varying signals are transmitted through the cables with at least one of the cables carrying an injected DC signal. The system associates the cable carrying the DC signal with a predetermined time varying signal and is capable of electronically switching the routes of the time varying signals if the cables are incorrectly physically attached to the first and second electrical components.

19 Claims, 3 Drawing Sheets

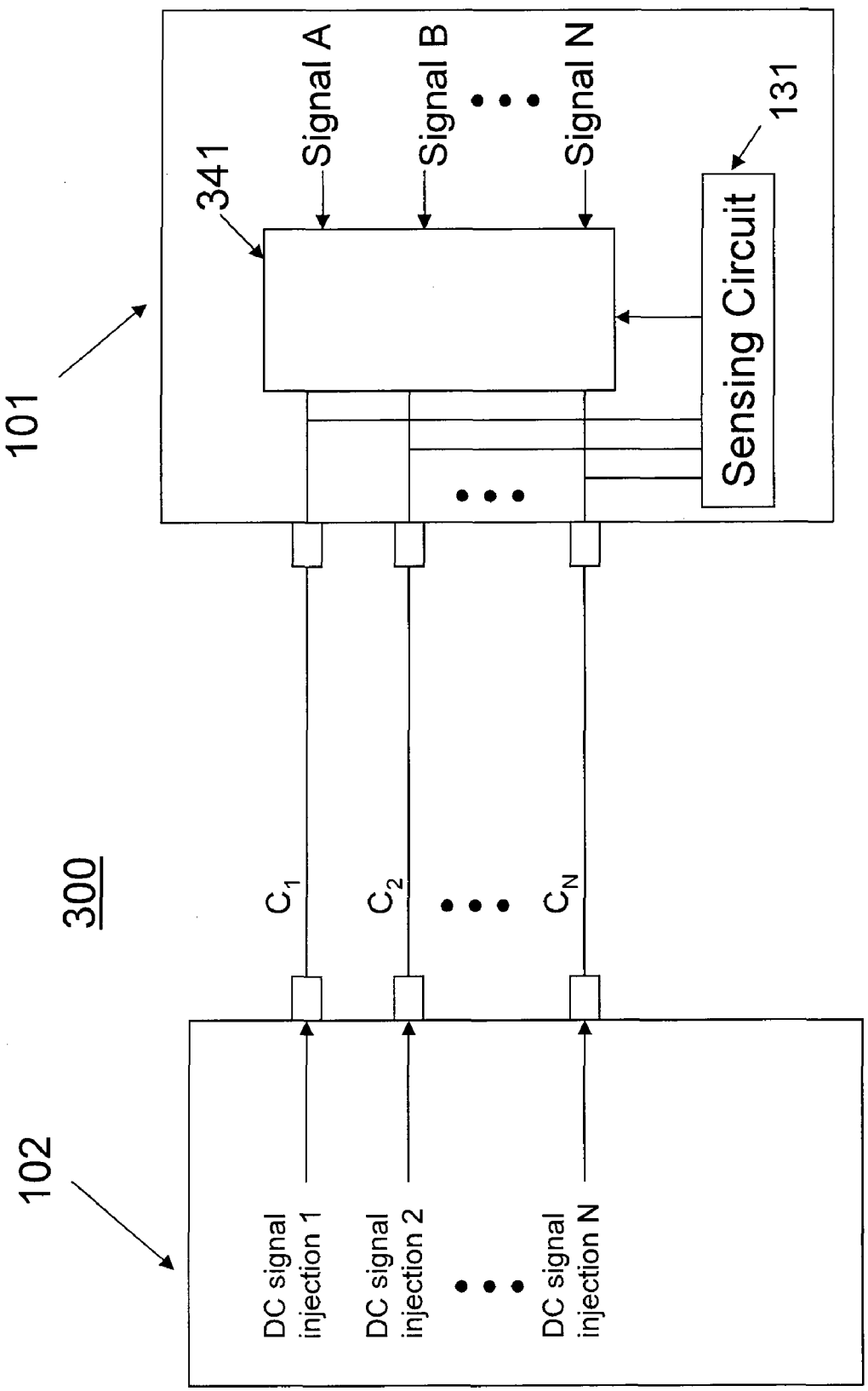

METHOD AND APPARATUS FOR IDENTIFYING AND SELECTING PROPER CABLE CONNECTIONS

CROSS REFERENCE TO RELATED APPLICATION

This application claims priority to U.S. Provisional Application 61/077,010, entitled "Method and Apparatus for Identifying and Selecting Proper Cable Connections", which was filed on Jun. 30, 2008 and is hereby incorporated by reference.

FIELD OF THE INVENTION

The present invention generally relates to systems, methods, and devices for interconnecting electrical components, and more particularly, systems, methods, and devices for determining whether cables are correctly connected between two devices and electronically switching the cable connections to electronically correct incorrect physical cable connections between hardware components.

BACKGROUND OF THE INVENTION

During installation or maintenance of two devices connected via cables, there exists a possibility that the cables might be cross connected. Moreover, as the number of cables increases, so does the chance that a cable may be connected to the wrong connector. The potential for incorrectly making connections may be especially high if the hardware installers are not professionally trained, if the location of the equipment is somewhat difficult to reach or access, and/or if the lighting conditions are less than favorable at the time of working with the components.

Cross-connecting one or more components may cause the device to not operate and thus increase the overall installation, maintenance time, testing time, and/or decrease customer satisfaction. Therefore, a variety of methods have been used to alleviate this situation. One method for preventing incorrect cable interconnections is to provide different connector types on each of the signal paths making it physically impossible to connect the cables to the wrong port. This method has a significant drawback in that it involves the use of a number of custom cables with custom connectors. The use of custom cables increases production costs, and becomes an inconvenience to installers who are then forced to carry a number of different cable types. This disadvantage becomes significantly worse as the number of cables increases.

Another prior art technique for preventing incorrect cable connections involves using color codes or labels on the cables and/or the components. Such techniques still depend on the care taken to match the labels, the durability and readability of the labels, and the accuracy of the labeling. Other physical methods of preventing incorrect cable connections have been used, but they generally suffer from the same deficiencies.

Thus, it is desirable to have a system, method and apparatus for preventing incorrect cable interconnections without special cables or connector types.

SUMMARY OF THE INVENTION

In an exemplary embodiment, a system may comprise a first cable connecting a first device and a second device, and a second cable connecting the first device and the second device. The two devices are configured to transfer a first time varying signal and a second time varying signal over the first and second cables, respectively, and a DC signal is also transferred through the second cable. In the exemplary embodiment, the second device is configured to select a transmission route of the first and second time varying signals based on the presence of the DC signal.

Cables are often used to interconnect electrical components and devices. In particular, cables are often used to interconnect two radio frequency (RF) hardware components, such as a transceiver and a low noise block (LNB) down converter. For example, two coaxial cables may be used to connect a transceiver to a LNB down converter. In this example, one cable carries a 'left hand' polarization signal and the other cable carries a 'right hand' polarization signal. Injecting a DC signal into at least one of the cables aides in determining the correct signal route.

Similarly, in accordance with an exemplary embodiment, a satellite receiver system comprises a first electrical component, a second electrical component, and at least two cables connecting the first and second electrical components. RF signals are transmitted through the cables with at least one of the cables carrying an injected DC signal. The satellite receiver system associates the cable carrying the DC signal with a predetermined RF signal and is capable of electronically switching the routes of the RF signals if the cables were incorrectly physically attached to the first and second electrical components.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 3 illustrates a block diagram of an exemplary embodiment of system with 3 or more signals.

DETAILED DESCRIPTION

While exemplary embodiments are described herein in sufficient detail to enable those skilled in the art to practice the invention, it should be understood that other embodiments may be realized and that logical material, electrical, and mechanical changes may be made without departing from the spirit and scope of the invention. Thus, the following detailed description is presented for purposes of illustration only. Furthermore, references to components or devices may be used interchangeably.

In accordance with an exemplary embodiment of the present invention, two electronic components are connected for communicating time varying signals from a first component to a second component over at least two cables. In an exemplary embodiment, the time varying signals are radio frequency (RF) signals. Although described herein as RF signals, the signals may be other AC signals, for example, audio signals, video signals, and the like. In this example, the devices are configured such that a DC signal is also provided over one of the at least two cables. The devices are configured to determine, based on the presence or absence of the DC signal, if the cables were properly connected. If the DC signal is detected on the wrong connection (or is not present on the anticipated connection), the system is configured to electronically switch the two connections. Thus, in an exemplary embodiment, systems, methods, and devices are provided for ensuring proper RF signal path connections even if the cables are connected to the wrong ports.

Figure 1:
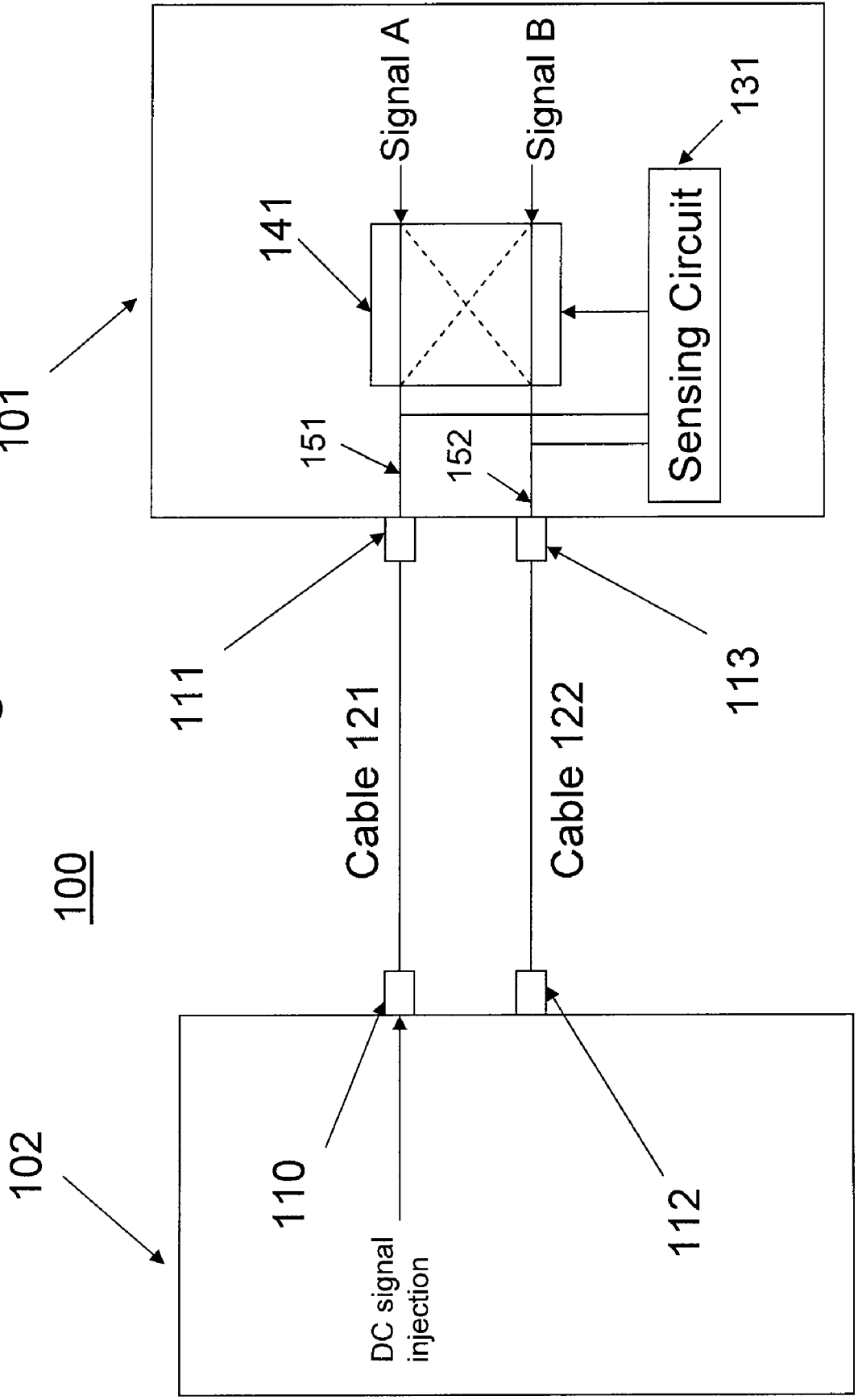
FIG. 1 illustrates a block diagram of an exemplary embodiment of a correctly connected system.

With reference now to FIG. 1, in accordance with an exemplary embodiment of the present invention, a system 100 comprises a first electrical component 101 and a second electrical component 102 that are connected to each other via a first cable 121 and a second cable 122. First cable 121 is connected to first electrical component 101 at a connector 111 and to second electrical component 102 at a connector 110. Similarly, second cable 122 is connected to first electrical component 101 at a connector 113 and to second electrical component 102 at a connector 112.

In accordance with an exemplary embodiment, although electrical components 101 and 102 communicate RF signals between them over cables 121, 122, electrical component 102 is configured to inject a DC signal on at least one signal output. For example, electrical component 102 is configured to inject a DC signal on the signal output associated with connector 110/cable 121.

Furthermore, in an exemplary embodiment, electrical component 101 comprises a sensing circuit 131 and a switch 141. Sensing circuit 131 is associated with one or both of connectors 111, 113. In another exemplary embodiment, more than one sensing circuit 131 may be used. For example, one sensing circuit may be used for each connector that is monitored. At least one or more of connectors 111, 113 are monitored in order to determine proper signal routing. In an exemplary embodiment, component 1010 comprises "N" number of connectors and sensing circuit 131 senses at least N−1 of the connectors. In one embodiment, sensing circuit 131 monitors the RF signals prior to transmission through switch 141. In another embodiment, sensing circuit 131 monitors the RF signals after transmission through switch 141.

Sensing circuit 131 may comprise a comparator, a digital logic circuit, a transistor, a diode circuit, or any combination thereof which is suitable for sensing current. Furthermore, sensing circuit 131 may comprise any suitable circuit(s) for sensing whether a DC signal is present at a particular connector(s). Sensing circuit may further be configured to control switch 141 and cause switching to occur based on the presence or absence of an expected voltage at a particular connector.

In an exemplary embodiment, switch 141 is connected to connectors 111, 113, and to a first and second signal connection points identified in FIG. 1 as 151, 152. These connection points may respectively carry signals designated as signal A and signal B. Switch 141 may be further configured to pass signal A to connector 111 and signal B to connector 113 in a "pass through mode". Switch 141 may further be configured to communicate signal A to connector 113 and signal B to connector 111 in a "switch mode." It is noted that the signals may be passed in the opposite direction as well. In other words, the signals may be sent, received, or both through switch 141.

Moreover, switch 141 may be controlled by sensing circuit 131 that determines when to operate switch 141 in a "pass through mode" and when to operate switch 141 in a "switch mode." In an exemplary embodiment, switch 141 automatically switches signal paths based on the determination of sensing circuit 131. In another exemplary embodiment, a user can manually operate switch 141 to facilitate changing the mode. In one embodiment, the user is provided information relating to the values monitored by sensing circuit 131. In other embodiments, the user operates switch 141 as needed and as another option to correctly configure system 100. In other words, operating switch 141 provides another option to correctly arrange system 100.

Figure 2:
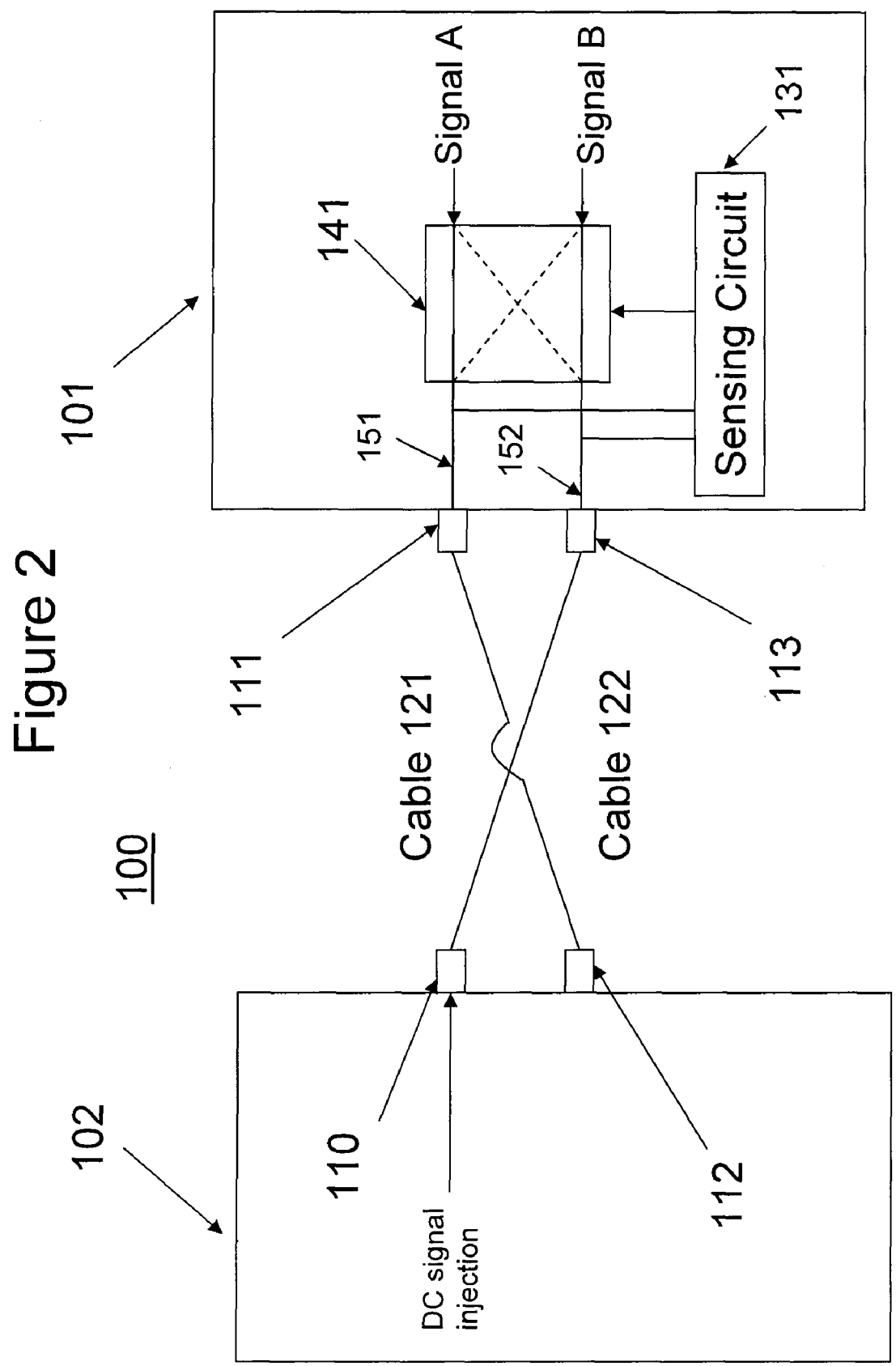
FIG. 2 illustrates a block diagram of an exemplary embodiment of an incorrectly connected system.

Thus, with reference now to FIG. 2, in an exemplary embodiment, if cables 121, 122 are crossed, the same end result may be achieved as was obtained with reference to FIG. 1 when the cables were not crossed. This is done through proper control of switch 141. For example, assembly 200 is configured such that if in FIG. 1, signal A reaches connector 110 with switch 141 in "pass through mode", in FIG. 2 signal A still reaches connector 110 with switch 141 in "switched mode." Thus, in an exemplary embodiment, if cables 121, 122 are crossed during installation, switch 141 cross connects the cables once more to reverse the crossed connection such that the signals reach their intended destinations.

In an exemplary embodiment, first electrical component 101 comprises a transceiver. For example, the transceiver may be a Ka-band transceiver configured to transmit and/or receive Ka-band signals from a satellite. The transceiver may also communicate signals in the Ku, K, or Q-band. Furthermore, the transceiver may communicate left hand and right hand polarization signals from the transceiver to the second electrical component over the first and second cables 121, 122. For example, the transceiver may comprise a transceiver such as US Monolithics transceiver model number USM-TXR-KA01-F-01-110. Furthermore, first electrical component 101 may comprise any suitable transceiver.

In accordance with an exemplary embodiment, first electrical component 101 comprises a variety of components. For example, first electrical component 101 may be a receiver. In another embodiment, first electrical component 101 may be a transmitter. In another embodiment, first electrical component 101 may be any RF device such as a radio, modem, GPS device, or a RADAR system.

In accordance with an exemplary embodiment, second electrical component 102 may comprise a low noise block ("LNB") downconverter. For example, the LNB may be any LNB downconverter manufactured by Microelectronics Technologies, Inc. Moreover, second electrical component 102 may comprise a data modem or any hardware with an RF interface signal. In this exemplary embodiment, the LNB is configured to apply a 5V DC signal to the cable where the right hand polarized signal is supposed to be routed. The transceiver may be configured to sense the 5V DC signal and a switch matrix is configured to invert the signal paths if necessary to provide the proper signal at this port. As would be understood by one skilled in the art, the DC signal could be any value, and the DC signal could be injected into either first cable 121 or second cable 122.

Furthermore, first and second electrical components 101, 102 may comprise other devices that are connected using two or more physical conveyances, such as cables, to communicate signals between the two devices. In an exemplary embodiment, the communicated signals may include RF, AC, audio signals, video signals. In another exemplary embodiment, first and second components 101, 102 could be stereo, TV, security cameras, or the like. In an exemplary embodiment, the cables are one foot in length; however the cables may be any length suitable for sufficient signal transmission without excessive loss.

In a more detailed exemplary embodiment, the method facilitates distinguishing between right and left hand polarized signals for the Ka-band transceiver to Ka-band LNB. The input RF signals may or may not be applied at the correct inputs, so a similar method as used with incorrect cable connections is used in such a scenario. In an exemplary embodiment, the type of input signal is detected by determining which input signal is applied to each signal path, as well as determining which output cable configuration is applied to the output connectors. The proper signal is automatically routed to the proper output based on those determinations. Detecting the input signal may include demodulating the RF signal to determine which data signal is present.

In accordance with an exemplary embodiment, the system 100 is configured to route RF signals correctly between the first and second components if the polarizer is incorrectly installed. In other words, even if the cables are correctly attached, an incorrectly installed polarizer would still result in the RF signals being routed incorrectly. In an exemplary embodiment, system 100 is able to detect the incorrect polarization and switch the RF signals.

In an exemplary embodiment, a DC signal is continuously injected into at least one RF signal to facilitate the routing of signals through at least two cables. In another embodiment, a DC signal is only periodically injected into an RF signal. In yet another exemplary embodiment, a DC signal is injected only during an initialization process in order to route the RF signals correctly. Once a switch matrix is configured to correctly route the RF signals, the DC injection signal may no longer need to be injected.

In accordance with an exemplary embodiment and with reference to FIG. 3, a system 300 comprises three or more cables ($C_1, C_2 \ldots C_N$). The three or more cables are used to connect two electrical components 101, 102. By multiplexing a unique voltage on each cable, once all the cables are connected, the hardware can determine the correct transmission path of each of the cables ($C_1, C_2 \ldots C_N$). In an exemplary embodiment, a unique voltage is only injected into N−1 of the N cables. Similarly, in an exemplary embodiment, sensing circuit 131 may be configured to sense at least N−1 of the cable connections and to control a switch matrix 341. Switch matrix 341 may be used to switch each output to the proper cable connection. In this embodiment, it does not matter which connections are made, switch matrix 341 is configured to simply arrange the RF signal paths to match up with the correct transmission path. In an exemplary embodiment, switch matrix 341 may include a multiplexer, a series of switches, microprocessor, or the like.

In an exemplary embodiment, a unique voltage is any voltage that is capable of being detected and distinguished by sensing circuit 131. For example, if four cables are communicating RF signals from second electrical component 102 to first electrical component 101 then four unique voltages may be injected into the RF signals. The four unique voltages may be 0 V, 2 V, 4 V, and 6 V. The range of unique voltages is dependent in part on the sensitivity of sensing unit 131. In the above example, sensing unit 131 is able to distinguish between an approximate 2 volt difference and thus detect which RF signal is transmitted on which cable. Furthermore, a range of unique voltages may include voltage differences less than, or more than, about 2 volts.

In accordance with an exemplary embodiment, first electrical component 101 is configured to operate a switch matrix to facilitate the correct routing of RF signals. First electrical component 101 "knows" which DC signal is associated with a particular RF signal. For example, first electrical component 101 is "aware" that a cable with a 5 V DC signal is correlated to a right-hand polarized RF signal and can switch transmitted signals accordingly. In one embodiment, first electrical component 101 associates a particular RF signal with a particular injection signal. In another embodiment, first electrical component 101 associates a particular RF signal with a relative injection signal. For example, a right-hand polarized signal corresponds to a higher, or highest, voltage DC signal in relation to the other present injection signals. In an exemplary embodiment, first electrical component 101 operates a switch matrix to route signals based upon the association of an RF signal with an injection signal.

In one exemplary embodiment, the devices used to connect the first and second electrical components 101, 102 are coaxial cables. In other exemplary embodiments, the coaxial cables could be replaced with any physical connecting devices that are suitable for transmitting RF signals. For example, blind mate connectors, lead frames, co-planar waveguide, differential twisted wire pairs, or any suitable RF interconnect that can transmit a DC signal may be used to physically connect the two electrical components.

In another exemplary embodiment, the interconnect is made using F-type connectors on the end of the coaxial cables. Moreover, in an exemplary embodiment, any suitable connector type may be used at the end of the cables. For example, SMA connectors or N-type connectors as defined by MIL-SPEC standards.

As previously discussed, in accordance with an exemplary embodiment, two cables are used to connect the two electrical components. In other exemplary embodiments, any suitable number of cables may be used. In various exemplary embodiments, regardless of the number of cables, the cables and the associated connectors on the end of the cables are identical to each other (or at least two of the cables are identical) such that no special cables (or at least fewer special cables) are involved in the installation. Thus, in accordance with various exemplary embodiments, the systems, methods, and devices are configured to prevent incorrect cable interconnections without the use of different cables or connector types. Furthermore, a reduction in training and/or skill of the installers may be facilitated without a reduction in quality of the finished installation. In addition, exemplary embodiments are configured to facilitate the installation and/or maintenance of devices in difficult to reach locations and/or where lighting conditions may make it difficult to identify the proper connections. Moreover, exemplary embodiments are configured to reduce overall installation/maintenance time, testing/debugging time, and increase customer satisfaction. All this may be possible without an increase in production costs related to producing different cables and/or cable connectors, and without an increase in the number of different cables carried by the installers.

In accordance with an exemplary method for ensuring proper connection of two or more cables between two components, the connection method comprises the steps of: connecting a first component to a second component with first and second cables, communicating RF signals over both the first and second cables, further communicating a DC signal from the first component to the second component over one of the first and second cables; detecting the DC signal at the second component; determining if the DC signal was detected on an expected device connector; and electronically switching the connections if it was not found on the expected device connector. The first and second cables are similar to each other and have similar connectors. Furthermore, the assembly is configured for transmitting a RF signal between the two components over both the first and second cables.

In another exemplary embodiment, the method may comprise the steps of communicating various different DC signals over the two or more cables, detecting the DC signals, and determining whether the detected DC voltage level is as expected. If needed, the two or more connections are electronically switched such that the cables are connected as desired.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A system comprising:
   a first cable connecting a first device and a second device, wherein the first cable communicates a first time varying signal; and
   a second cable connecting the first device and the second device, wherein the second cable communicates a second time varying signal and a DC signal;
   wherein the second device is configured to select a transmission route of the first and second time varying signals based on the presence of the DC signal.

2. The system of claim 1, wherein the second device is configured to determine, based on the presence of the DC signal, if the first and second cables are properly physically connected.

3. The system of claim 1, wherein the second device further comprises a sensing circuit configured to detect the presence or absence of the DC signal in at least one of the first and second cables.

4. The system of claim 3, further comprising a switch configured to electronically switch a signal path in response to the sensing circuit not detecting the DC signal on an expected connection.

5. The system of claim 3, further comprising a switch configured to electronically switch a signal path in response to the sensing circuit detecting the DC signal on an unexpected connection.

6. The system of claim 1, wherein the first device is a transceiver and wherein the second device is a low noise block (LNB) downconverter in a satellite system.

7. The system of claim 6, further comprising:
   a connection correction unit integrated into either the transceiver or the LNB down converter, wherein the connection correction unit is configured to sense a DC signal associated with at least one of the first and second cables and switch the signal paths of the first and second time varying signals if the DC signal appears on an unexpected connection;
   wherein the first cable and the second cable each comprise a first end having a first connector of the same type and a second end having a second connector of the same type; and
   wherein the first ends of the first and second cables are connected to the transceiver, and wherein the second ends of the first and second cables are connected to the LNB down converter.

8. The system of claim 1, wherein the first and second time varying signals are at least one of a radio frequency signal, a video signal, or an audio signal.

9. A method comprising:
   communicating a first time varying signal over a first cable and communicating a second time varying signal over a second cable, wherein the first cable and the second cable each connect to a first component and a second component;
   communicating a DC signal over at least one of the first cable and the second cable;
   detecting the DC signal using a sensing circuit;
   determining if the DC signal is detected on an expected device connector of the first component or the second component; and
   electronically switching the connections of the first and second cables, using an electronic switch, in response to not detecting the DC signal on the expected device connector.

10. The method of claim 9, wherein the electronic switch operates in one of a pass through mode and a switch mode.

11. The method of claim 9, wherein the first cable and the second cable are similar to each other and have the same type of connectors.

12. A system comprising:
   a first component with a first connector and a second connector;
   a second component with a third connector and a fourth connector;
   wherein the first and second components are connected via at least two cables, and wherein AC signals are communicated through the at least two cables; and
   a switch configured to electronically switch the signal paths of the AC signals in response to the at least two cables being physically incorrectly attached to one of the connectors.

13. The system of claim 12, wherein a DC signal is injected into the AC signal communicated at the first connector, and wherein the AC signal at the third connector is sensed to determine if the DC signal injected into the AC signal at the first connector is present at the third connector in order to determine if the at least two cables have been physically incorrectly attached to one of the connectors.

14. The system of claim 12, wherein the connectors are at least one of an F-type connector, an SMA connector, or an N-type connector.

15. A method comprising:
   communicating various DC signals injected into time varying signals over three or more cables;
   detecting DC voltage levels of the DC signals;
   determining if the detected DC voltage levels correspond with expected DC voltage levels; and
   electronically switching connectors of the three or more cables such that the detected DC voltage levels match the expected DC voltage levels, resulting in the three or more cables communicating the time varying signals as desired.

16. The method of claim 15, further comprising injecting the DC signals into the time varying signals at least one of continuously, periodically, and during an initialization process.

17. The method of claim 15, wherein a switch matrix facilitates the electronically switching connectors of the three or more cables.

18. The method of claim 15, wherein the DC signals are injected into all but one of the time varying signals.

19. The method of claim 18, further comprising sensing all but one of the connectors of the three or more cables.

* * * * *